United States Patent
Yi et al.

(10) Patent No.: US 10,560,358 B2
(45) Date of Patent: Feb. 11, 2020

(54) METHOD FOR PERFORMING UPLINK PACKET DELAY MEASUREMENTS IN A WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR); Hyunjin Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/748,379

(22) PCT Filed: Jul. 19, 2016

(86) PCT No.: PCT/KR2016/007853
§ 371 (c)(1),
(2) Date: Jan. 29, 2018

(87) PCT Pub. No.: WO2017/026687
PCT Pub. Date: Feb. 16, 2017

(65) Prior Publication Data
US 2019/0007291 A1    Jan. 3, 2019

Related U.S. Application Data

(60) Provisional application No. 62/203,868, filed on Aug. 11, 2015.

(51) Int. Cl.
*H04L 12/26* (2006.01)
*H04W 24/08* (2009.01)

(52) U.S. Cl.
CPC ........ *H04L 43/0852* (2013.01); *H04L 43/106* (2013.01); *H04W 24/08* (2013.01); *H04L 43/16* (2013.01)

(58) Field of Classification Search
CPC ... H04L 43/0852; H04L 43/106; H04L 43/16; H04W 80/02
See application file for complete search history.

(56) References Cited

U.S. PATENT DOCUMENTS

2007/0258591 A1*  11/2007  Terry .................... H04L 1/187
                                                    380/247
2009/0041055 A1    2/2009  Yamasaki et al.
(Continued)

FOREIGN PATENT DOCUMENTS

EP    3297318 A1    3/2018
WO    2015090719 A1    6/2015

OTHER PUBLICATIONS

R2-152627, XP050969880: 3GPP TSG-RAN WG2 #90, Fukuoka, Japan, May 25-29, 2015, Kyocera, "Potential solutions for UL latency measurements," pp. 1-2.
(Continued)

*Primary Examiner* — Hassan Kizou
*Assistant Examiner* — Deepa Belur
(74) *Attorney, Agent, or Firm* — Dentons US LLP

(57) ABSTRACT

The present invention relates to a wireless communication system. More specifically, the present invention relates to a method and a device for performing UL packet delay measurement in a wireless communication system, the method comprising: checking whether a value of queuing delay of a PDCP SDU is above a threshold, and generating and transmitting a PDCP PDU including the PDCP SDU and a time stamp for the PDCP SDU, if the value of the queuing delay is above the threshold, wherein a value of the time stamp for the PDCP SDU is set to a time when the PDCP SDU is received from the upper layer.

10 Claims, 11 Drawing Sheets

(56) References Cited

U.S. PATENT DOCUMENTS

| | | | |
|---|---|---|---|
| 2010/0091709 A1* | 4/2010 | Yi .................... | H04W 12/02 |
| | | | 370/328 |
| 2011/0188377 A1 | 8/2011 | Kim et al. | |
| 2012/0039169 A1 | 2/2012 | Susitaival et al. | |
| 2014/0254398 A1* | 9/2014 | Li .................... | H04W 28/08 |
| | | | 370/252 |
| 2015/0023370 A1 | 1/2015 | Sammour et al. | |
| 2016/0044690 A1* | 2/2016 | Li .................... | H04W 52/0209 |
| | | | 370/329 |
| 2016/0164793 A1* | 6/2016 | Basu Mallick ....... | H04W 28/06 |
| | | | 370/235 |
| 2018/0041413 A1* | 2/2018 | Yi .................... | H04W 80/02 |
| 2018/0084451 A1* | 3/2018 | Fukuta ................ | H04W 24/10 |
| 2018/0213426 A1* | 7/2018 | Latheef ............... | H04W 24/10 |

OTHER PUBLICATIONS

XP051293449: 3GPP TS 36.314 V12.0.0 (Sep. 2014) 3rd Generation Partnership Project; Technical Specification Group Radio Access Network; Evolved Universal Terrestrial Radio Access (E-UTRA); Layer 2—Measurements, pp. 1-20.

XP050606368: Tdoc R2-121601, #GPP TSG-RAN WG2 #77bis, Jeju, Korea, Mar. 26-30, 2012, Ericsson, ST-Ericsson, "Definition of delay sensitive Qos experience measurement," pp. 1-2.

\* cited by examiner

[Fig. 1]
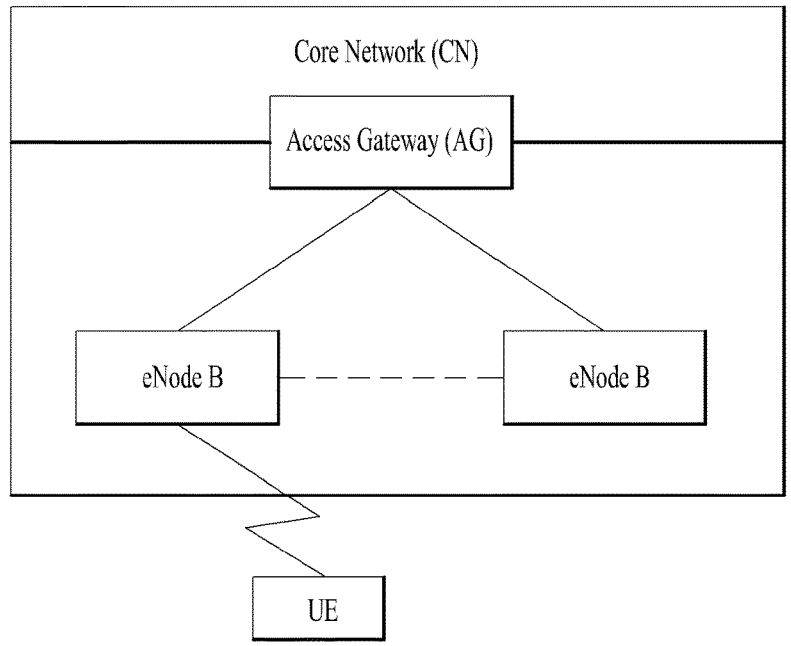
[Fig. 2A]
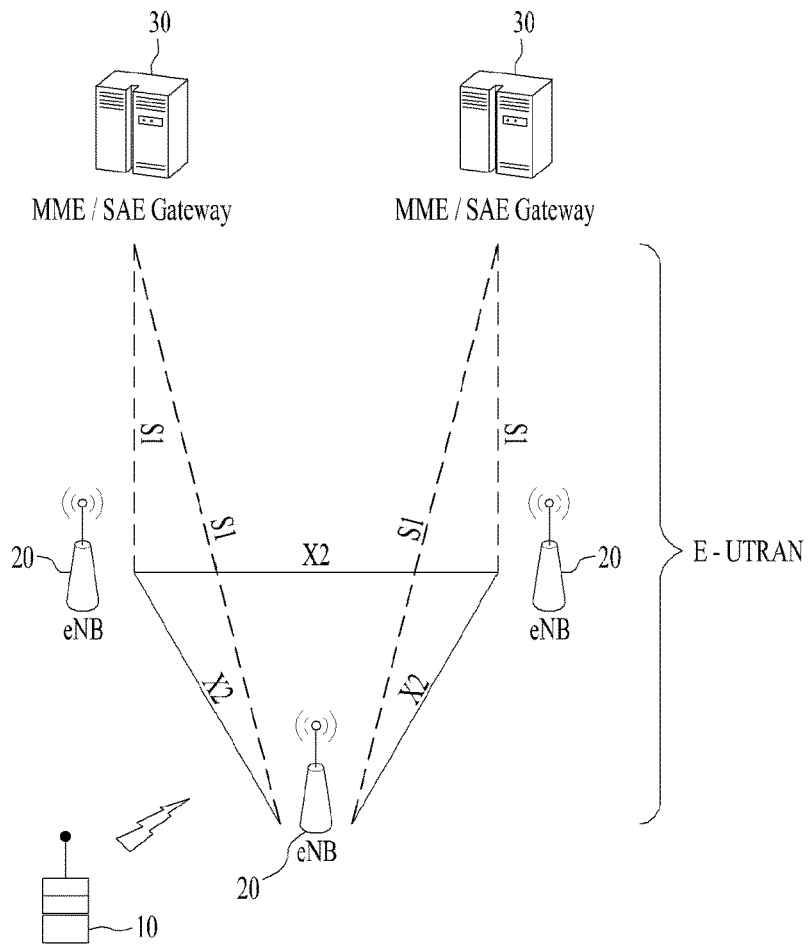

[Fig. 2B]
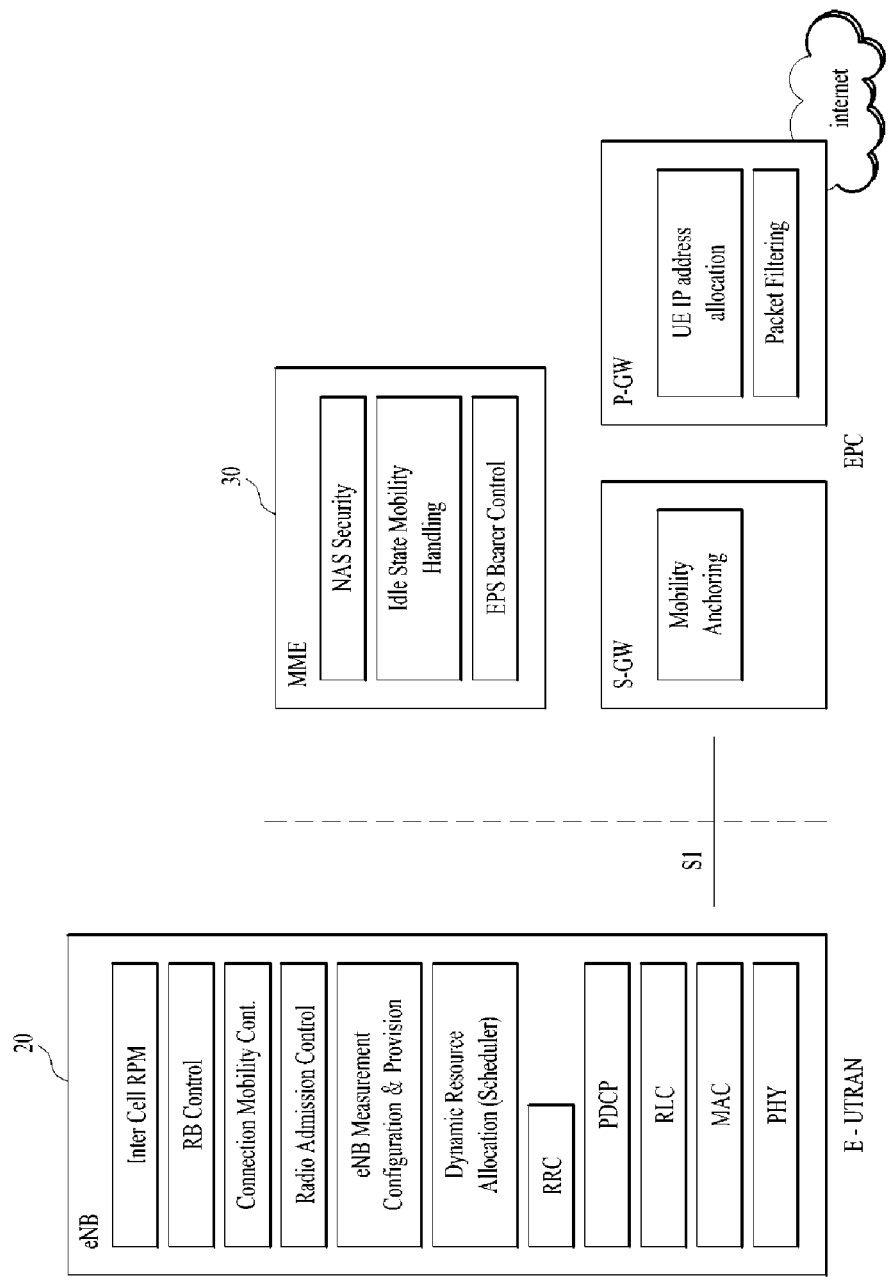

[Fig. 3]
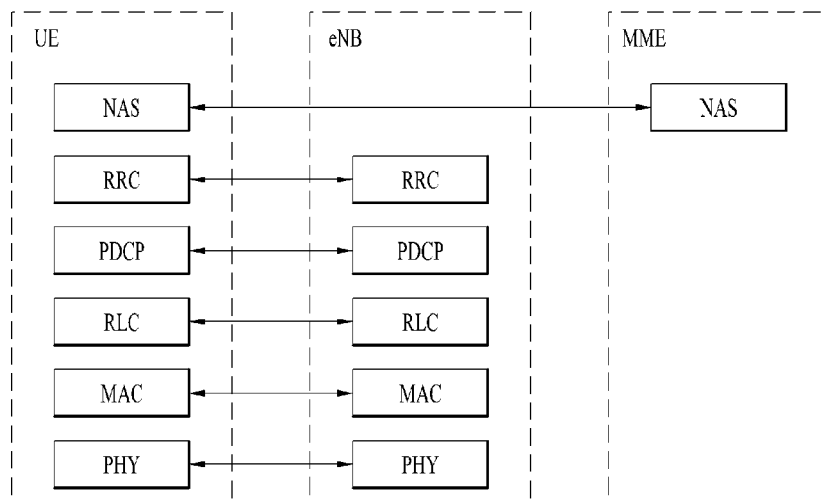
(a) Control-Plane Protocol Stack
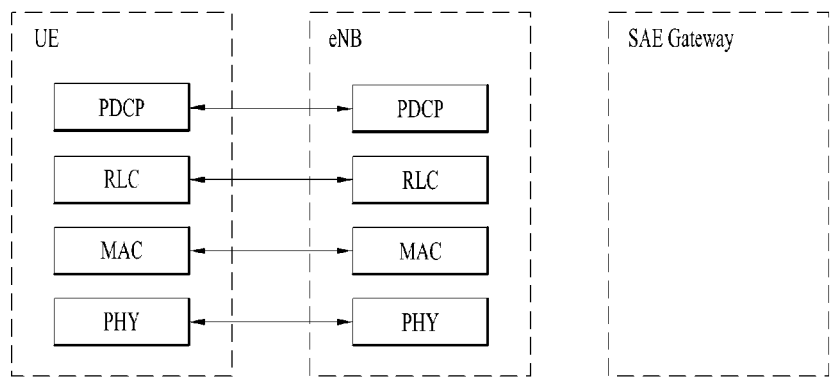
(b) User-Plane Protocol Stack
[Fig. 4]
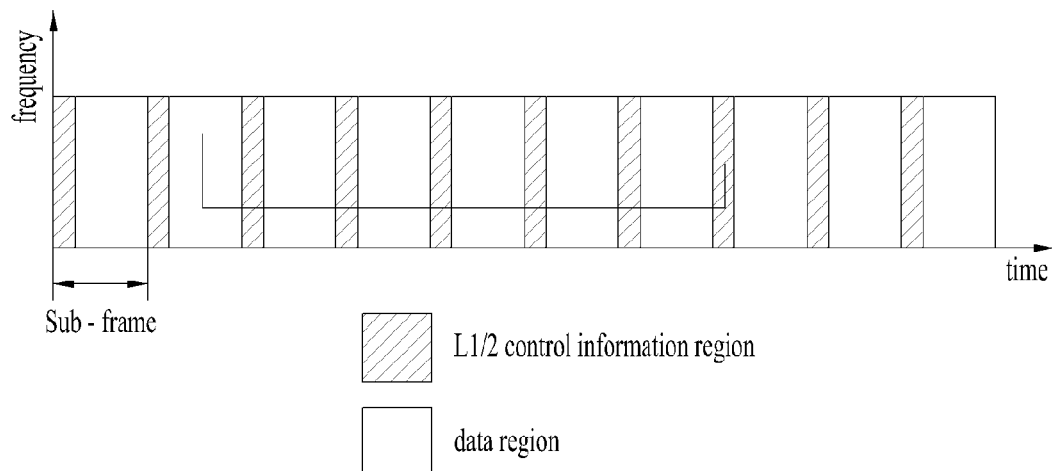

[Fig. 5]
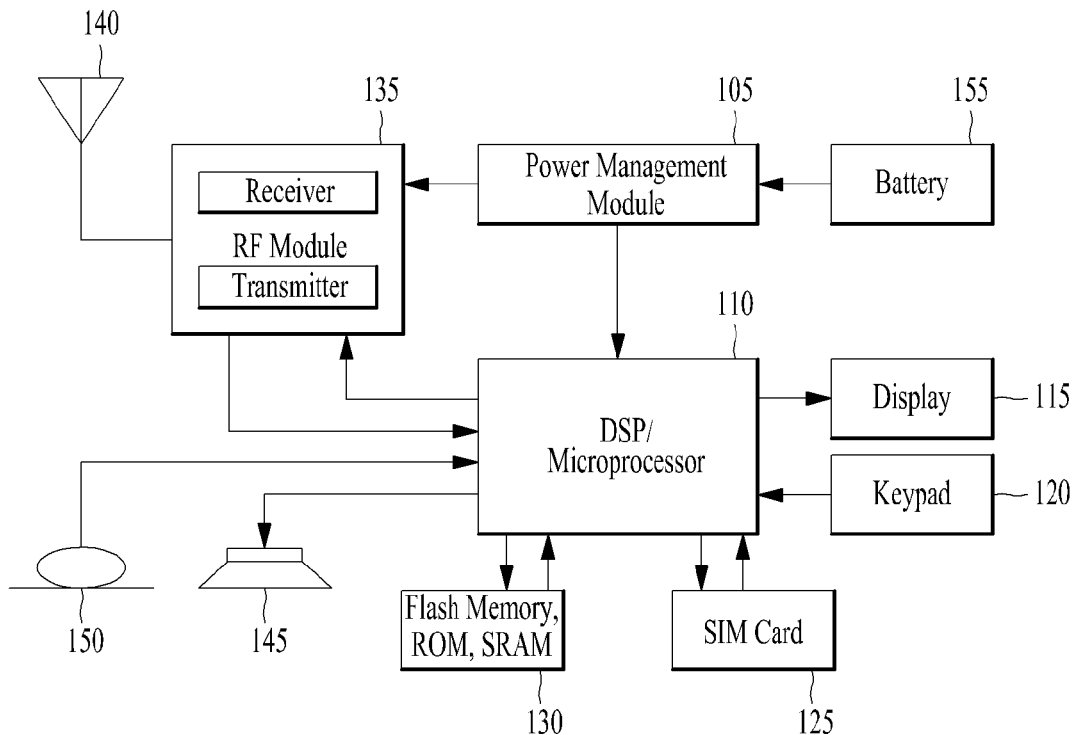
[Fig. 6]
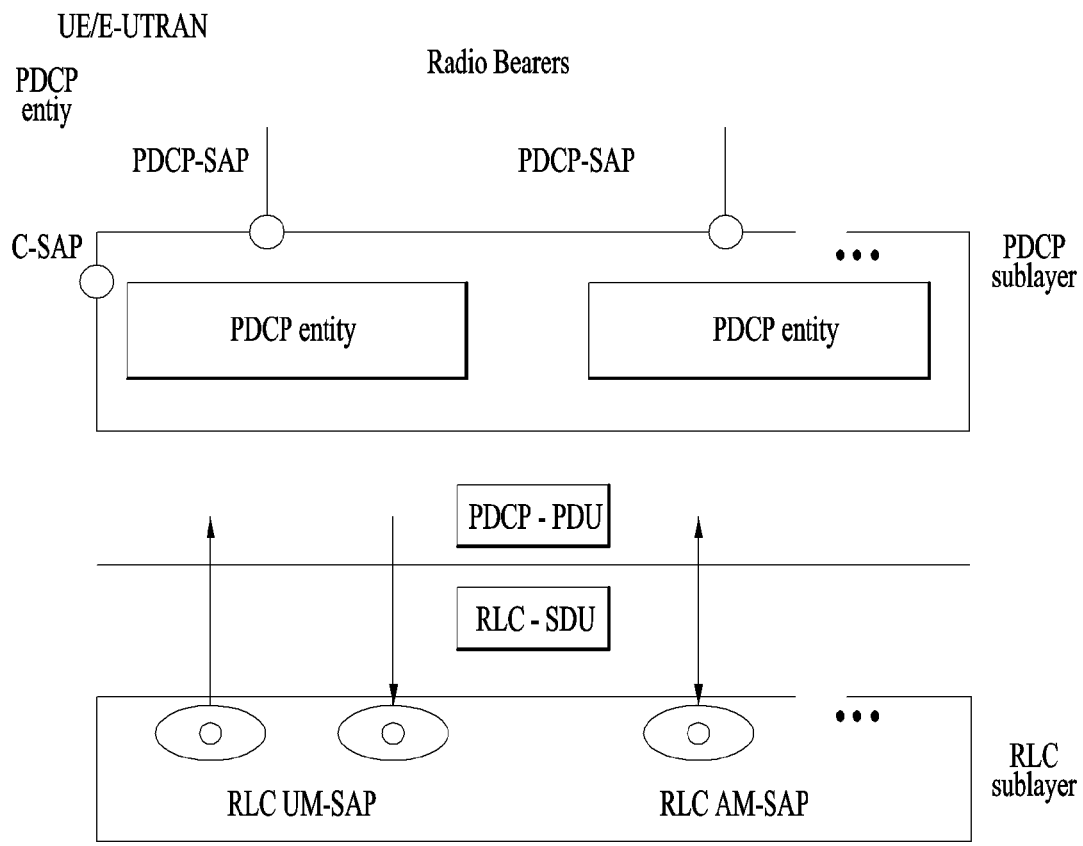

[Fig. 7]
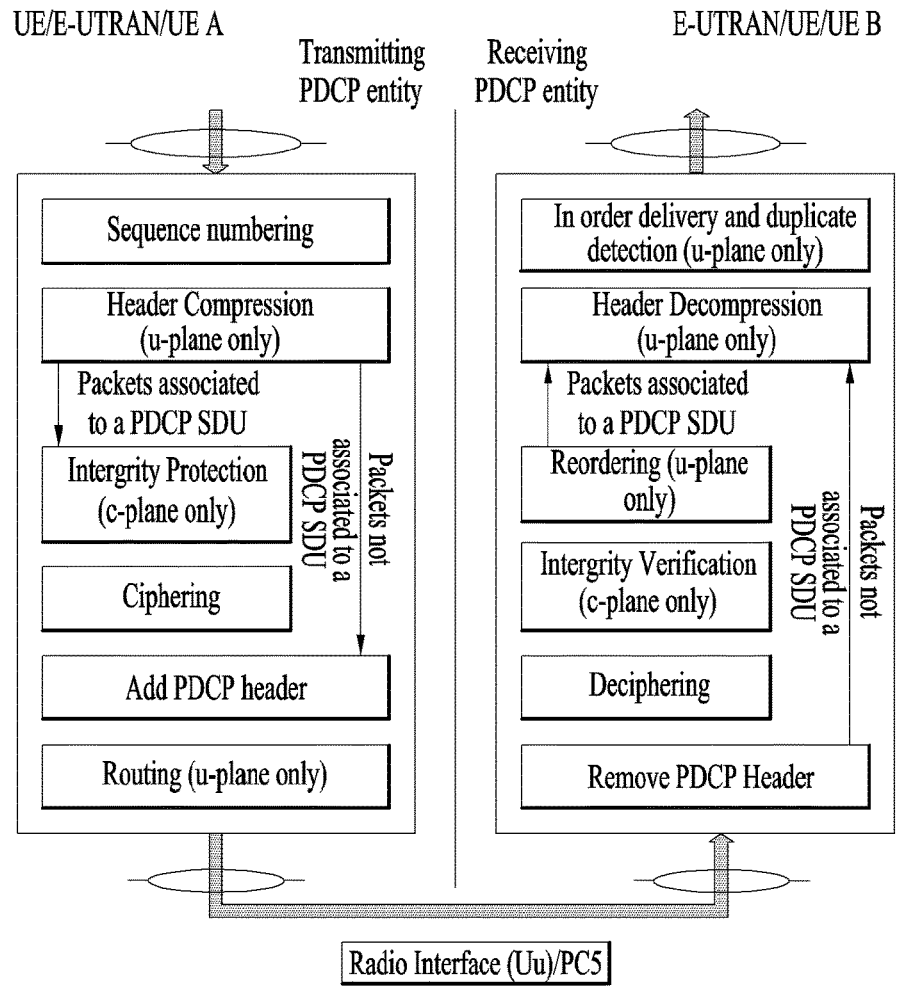
[Fig. 8A]
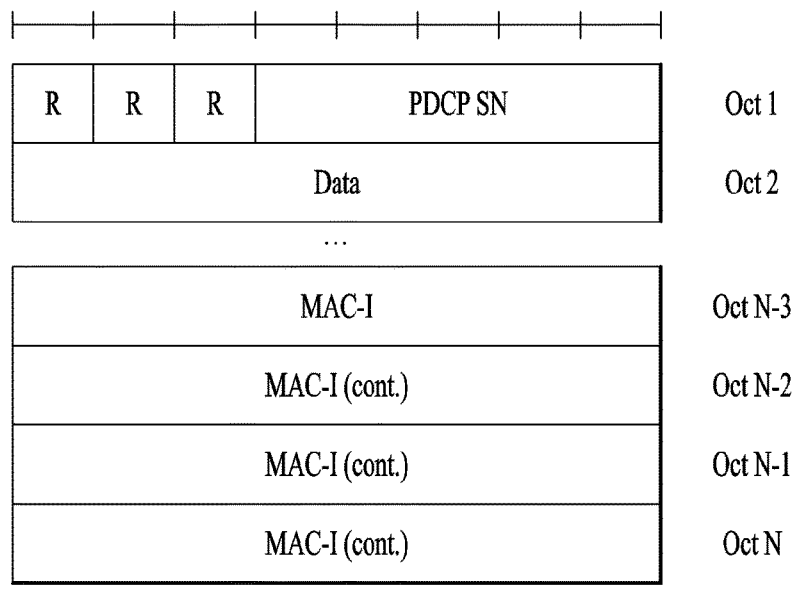
PDCP Data PDU format for SRBs

[Fig. 8B]
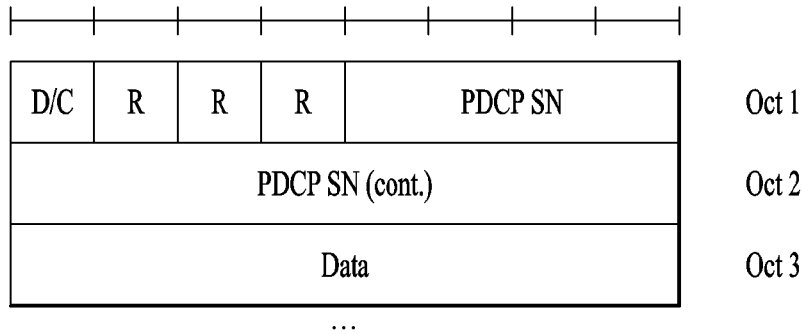
PDCP Data PDU format for DRBs using a 12 bit SN
[Fig. 8C]
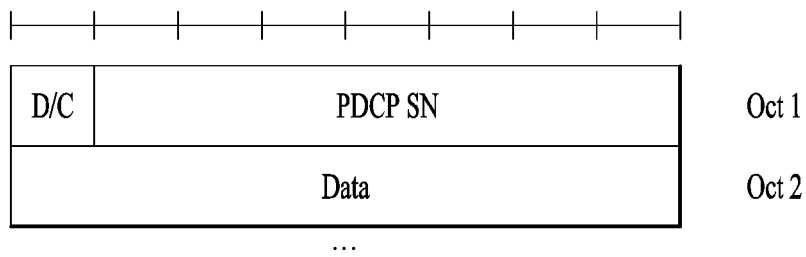
PDCP Data PDU format for DRBs using 7 bit SN
[Fig. 9A]
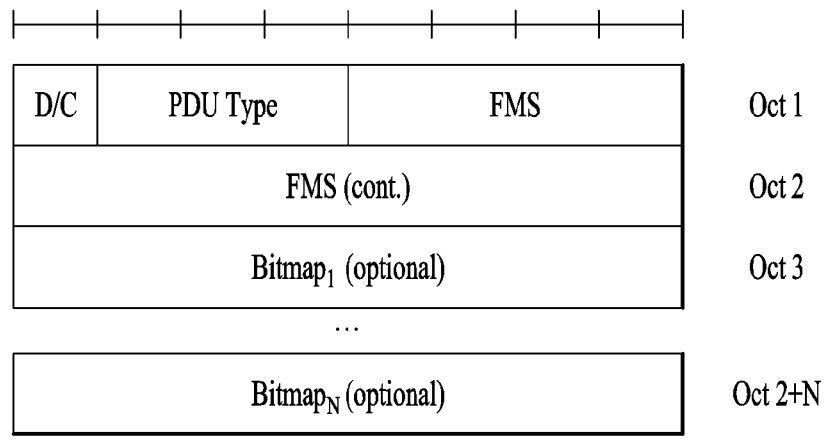
PDCP Control PDU format for PDCP status report using a 12 bit SN

[Fig. 9B]
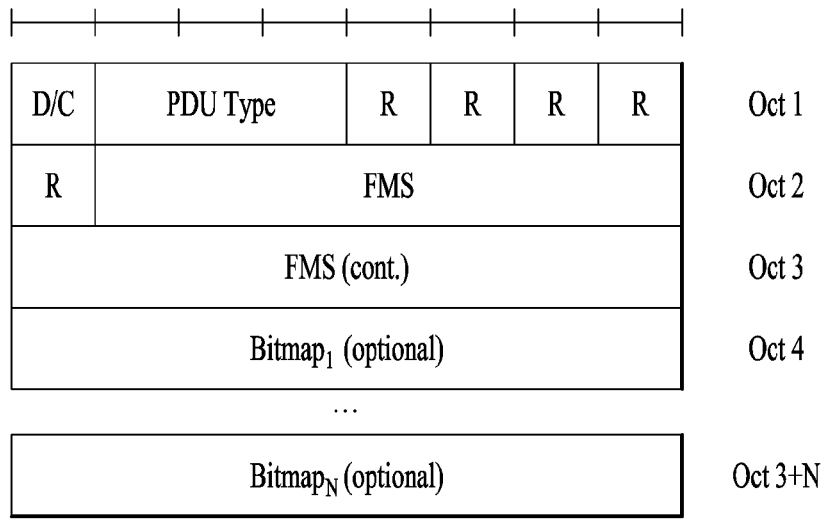
PDCP Control PDU format for PDCP status report using a 15 bit SN
[Fig. 9C]
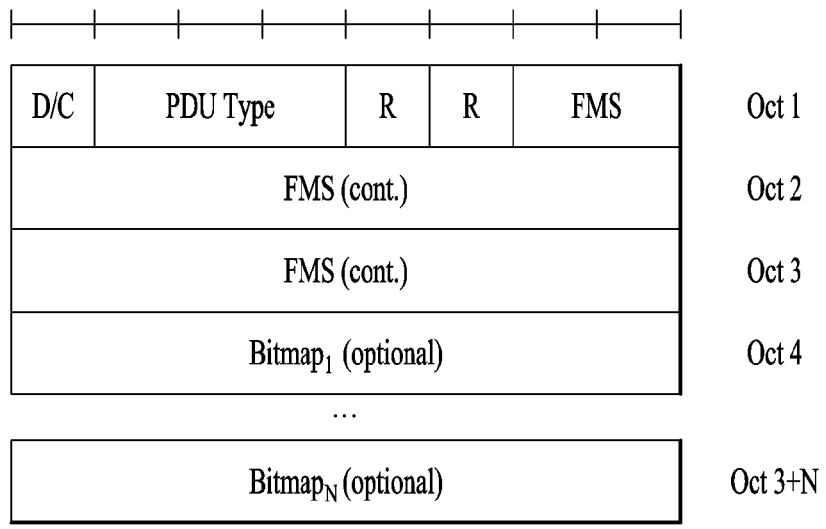
PDCP Control PDU format for PDCP status report using an 18 bit SN
[Fig. 9D]
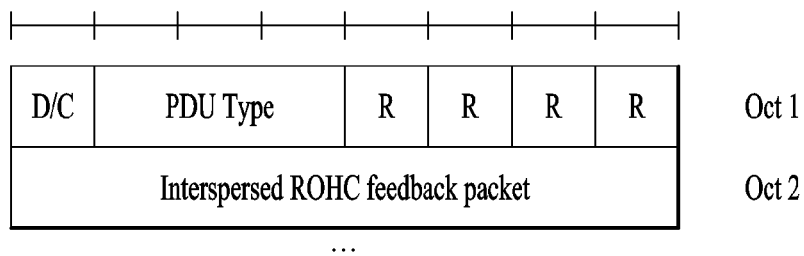
PDCP Control PDU format for interspersed ROHC feedback packet

[Fig. 10A]
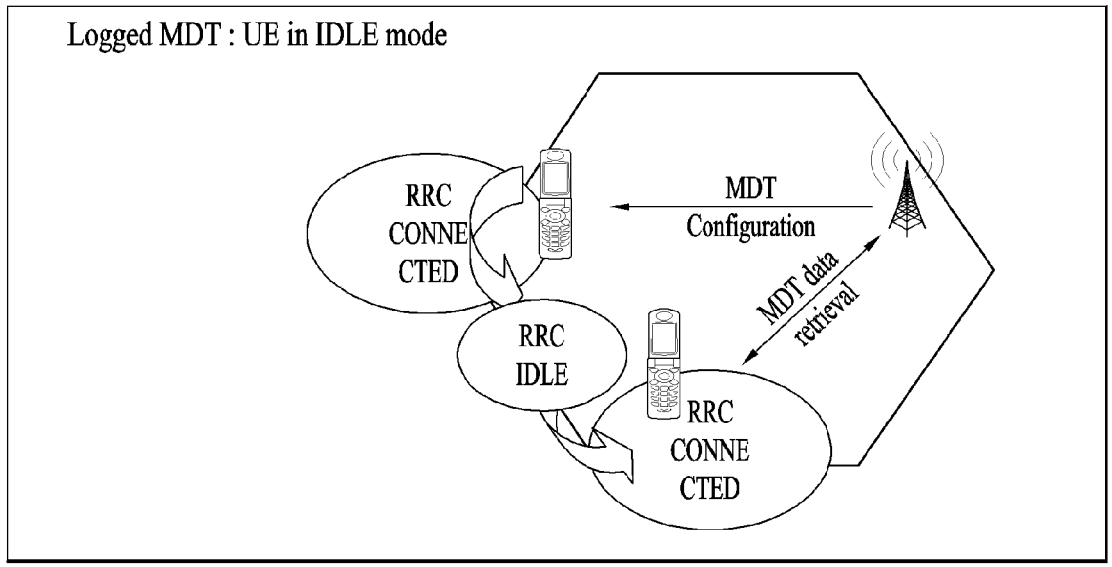
[Fig. 10B]
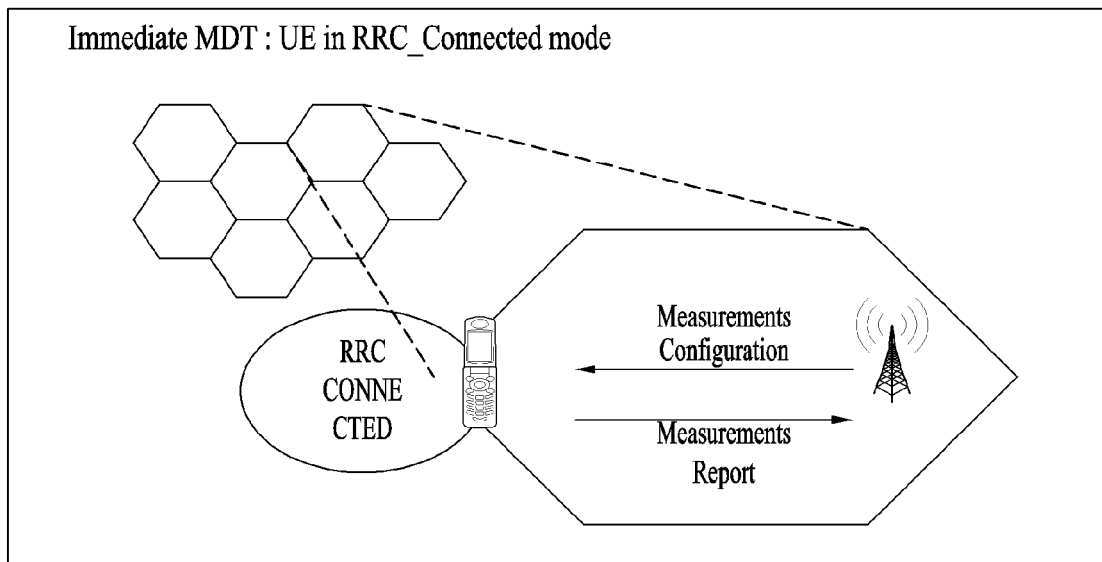

[Fig. 11]
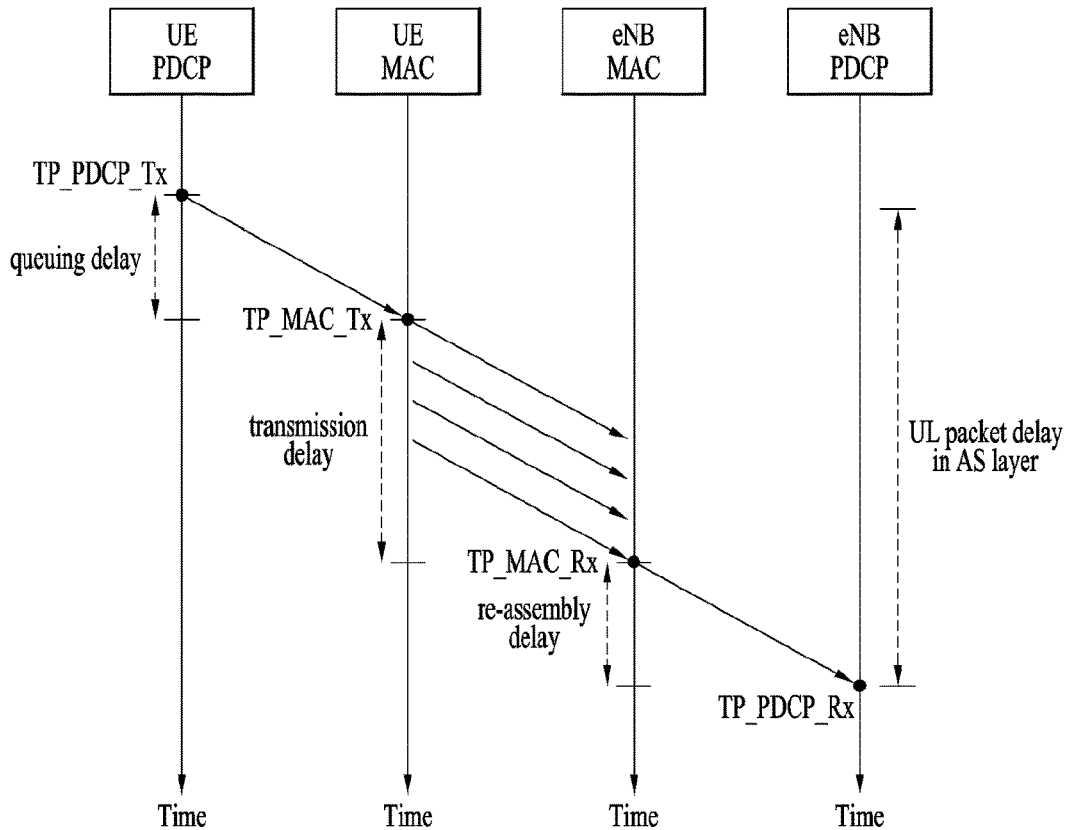
[Fig. 12]
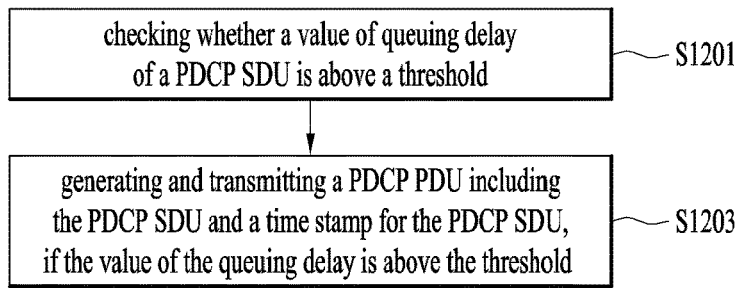
[Fig. 13A]
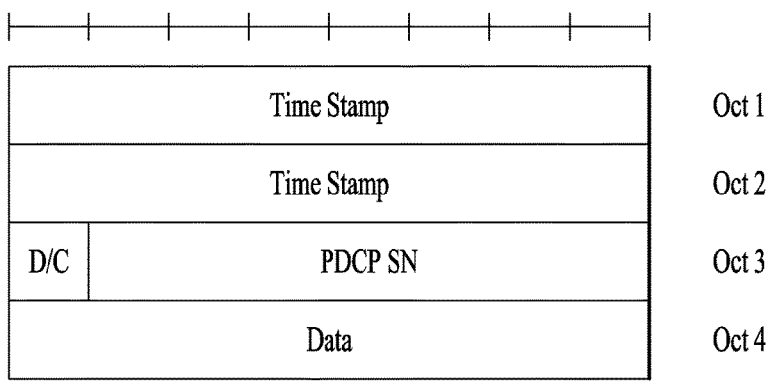

[Fig. 13B]
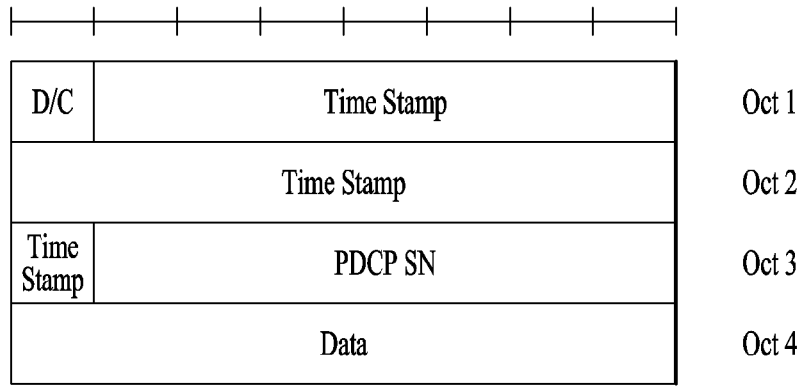
[Fig. 13C]
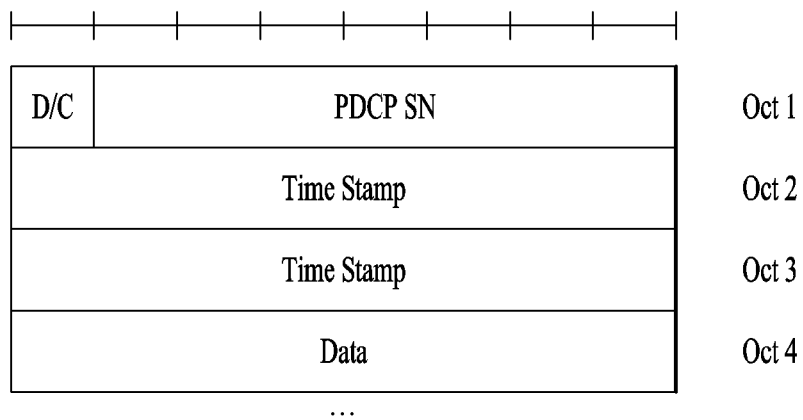
[Fig. 13D]
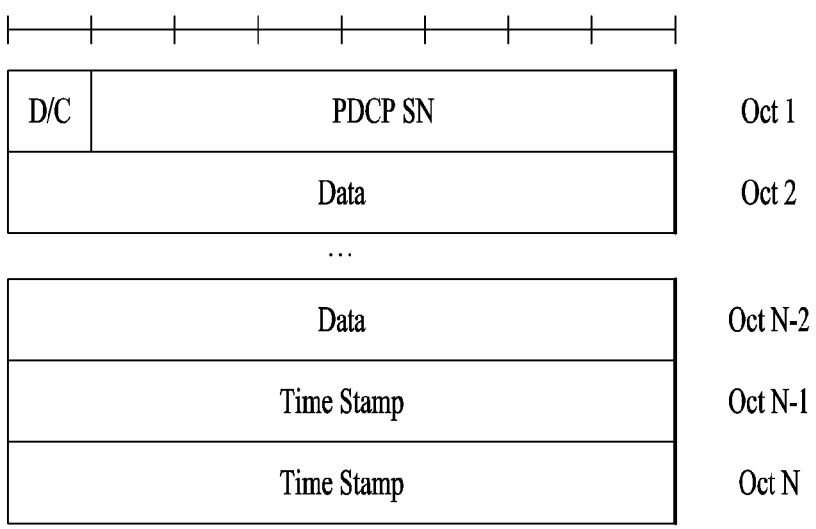

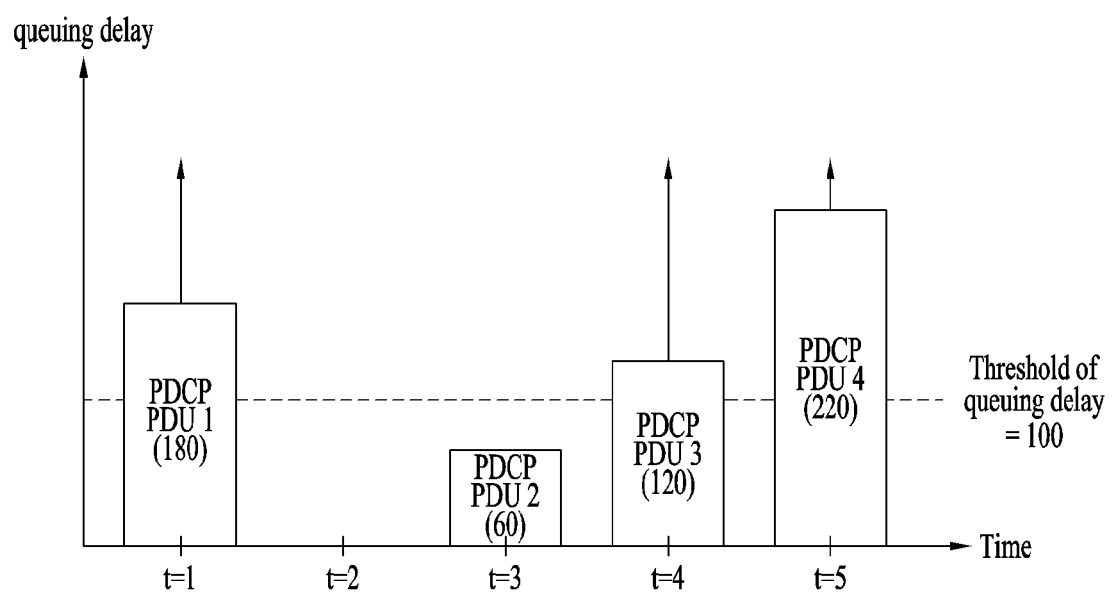
[Fig. 14]

METHOD FOR PERFORMING UPLINK PACKET DELAY MEASUREMENTS IN A WIRELESS COMMUNICATION SYSTEM AND A DEVICE THEREFOR

This application is a 35 USC § 371 National Stage entry of International Application No. PCT/KR2016/007853 filed on Jul. 19, 2016, and claims priority to U.S. Provisional Application No. 62/203,868 filed on Aug. 11, 2015, all of which are hereby incorporated by reference in their entireties as if fully set forth herein.

TECHNICAL FIELD

The present invention relates to a wireless communication system and, more particularly, to a method for performing uplink (UL) packet delay measurements in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for performing UL packet measurements in a wireless communication system. The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

In order to overcome overhead problem when including the time information for measuring UL packet delay for each PDCP PDU, it is invented that the UE transmits the Time Stamp PDCP PDU when queuing delay of a PDCP SDU is above a threshold.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a conceptual diagram for a PDCP entity architecture;

FIG. 7 is a conceptual diagram for functional view of a PDCP entity;

FIGS. 8A to 8C are diagrams for formats of PDCP data PDU;

FIGS. 9A to 9D are diagrams for formats of PDCP control PDU;

FIG. 10A is a conceptual diagram for Logged MDT, and FIG. 10B is a conceptual diagram for Immediate MDT;

FIG. 11 is a conceptual diagram for decomposition of UL packet delay;

FIG. 12 is conceptual diagram for performing an UL packet delay measurement according to an exemplary embodiment of the present invention;

FIGS. 13A to 13D show various formats of a PDCP PDU including a time stamp according to an exemplary embodiment of the present invention; and FIG. 14 shows an example for transmitting Time Stamp PDCP PDUs according to an exemplary embodiment of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor 110 and RF module (transmiceiver; 135. The DSP/microprocessor (110) is electrically connected with the transciver (135) and controls it. The apparatus may further include power management module (105), battery (155), display (115), keypad (120), SIM card (125) memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is a conceptual diagram for a PDCP entity architecture.

FIG. 6 represents one possible structure for the PDCP sublayer, but it should not restrict implementation. Each RB (i.e. DRB and SRB, except for SRB0) is associated with one PDCP entity. Each PDCP entity is associated with one or two (one for each RLC entities depending on the RB characteristic (i.e. unidirectional or bi-directional) and RLC mode. The PDCP entities are located in the PDCP sublayer. The PDCP sublayer is configured by upper layers.

FIG. 7 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 7 represents the functional view of the PDCP entity for the PDCP sublayer; it should not restrict implementation. The figure is based on the radio interface protocol architecture.

At reception of a PDCP service data unit (SDU) from upper layers, the UE may start a discardTimer associated with this PDCP SDU. A transmitting side of each PDCP entity for DRBs may maintain the discardTimer. The duration of the discardTimer is configured by upper layers. In the transmitter, a new timer is started upon reception of a PDCP SDU from an upper layer. For a PDCP SDU received from upper layers, the UE may associate the PDCP sequence number (SN) corresponding to Next_PDCP_PDCP_TX_SN to the PDCP SDU, perform header compression of the PDCP SDU, perform integrity protection and ciphering using COUNT based on TX_HFN and the PDCP SN associated with this PDCP SDU, increment the Next_PDCP_PDCP_TX_SN by one, and submit the resulting PDCP Data PDU to lower layer. If the Next_PDCP_TX_SN is greater than Maximum_PDCP_SN, the Next_PDCP_TX_SN is set to '0' and TX_HFN is incremented by one.

When the discard timer expires for a PDCP SDU, or the successful delivery of a PDCP SDU is confirmed by PDCP status report, the UE may discard the PDCP SDU along with the corresponding PDCP PDU. If the corresponding PDCP PDU has already been submitted to lower layers the discard is indicated to lower layers. The transmitting side of each PDCP entity for DRBs may maintain the discard timer. The duration of the timer is configured by upper layers. In the transmitter, a new timer is started upon reception of an SDU from upper layer.

FIGS. 8A to 8C are diagrams for formats of PDCP data PDU.

A PDCP PDU is a bit string that is byte aligned (i.e. multiple of 8 bits) in length. In FIGS. 8A to 8C, bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a PDCP PDU is represented with the first and most significant bit in the leftmost bit and the last and least significant bit in the rightmost bit.

PDCP SDUs are bit strings that are byte aligned (i.e. multiple of 8 bits) in length. A compressed or uncompressed SDU is included into a PDCP PDU from the first bit onward.

FIG. 8A shows the format of the PDCP Data PDU carrying data for control plane SRBs.

FIG. 8B shows the format of the PDCP Data PDU when a 12 bit SN length is used. This format is applicable for PDCP Data PDUs carrying data from DRBs mapped on RLC AM or RLC UM.

FIG. 8C shows the format of the PDCP Data PDU when a 7 bit SN length is used. This format is applicable for PDCP Data PDUs carrying data from DRBs mapped on RLC UM.

The PDCP Data PDU is used to convey: i) a PDCP SDU SN, and data including an uncompressed PDCP SDU (user plane data, or control plane data), ii) a compressed PDCP SDU (user plane data only), and iii) a MAC-I field.

The PDCP SN field indicates a sequence number of PDCP SDU. The length of the PDCP SN is 5, 7, 12, 14, 16 or 18 bits as indicated in Table 1.

TABLE 1

| Length | Description |
| --- | --- |
| 5 | SRBs |
| 7 | DRBs, if configured by upper layers (pdcp-SN-Size [3]) |
| 12 | DRBs, if configured by upper layers (pdcp-SN-Size [3]) |
| 15 | DRBs, if configured by upper layers (pdcp-SN-Size [3]) |
| 16 | SLRBs |
| 18 | DRBs, if configured by upper layers (pdcp-SN-Size [3]) |

The Data field may include either one of i) Uncompressed PDCP SDU (user plane data, or control plane data), or ii) Compressed PDCP SDU (user plane data only).

The MAC-I field carries a message authentication code calculated. The length of the MAC-I is 32-bits. For control plane data that are not integrity protected, the MAC-I field is still present and should be padded with padding bits set to 0.

The R field is reserved. The length of the R field is 1 bit. In this version of the specification reserved bits shall be set to 0. Reserved bits shall be ignored by the receiver.

The D/C field indicates whether a PDCP PDU is a control PDU or a data PDU. The D/C field is indicated by Table 2.

TABLE 2

| Bit | Description |
| --- | --- |
| 0 | Control PDU |
| 1 | Data PDU |

FIGS. 9A to 9D are diagrams for formats of PDCP control PDU.

The PDCP Control PDU is used to convey: i) a PDCP status report indicating which PDCP SDUs are missing and which are not following a PDCP re-establishment, ii) header compression control information (e.g. interspersed ROHC feedback).

FIG. 9A shows the format of the PDCP Control PDU carrying one PDCP status report when a 12 bit SN length is used, FIG. 9B shows the format of the PDCP Control PDU carrying one PDCP status report when a 15 bit SN length is used, and FIG. 9C shows the format of the PDCP Control PDU carrying one PDCP status report when an 18 bit SN length is used. This format is applicable for DRBs mapped on RLC AM.

FIG. 9D shows the format of the PDCP Control PDU carrying one interspersed ROHC feedback packet. This format is applicable for DRBs mapped on RLC AM or RLC UM.

The PDU type field indicates for what the control PDU is. The length of the PDU type field is 3 bits. The PDU type field is indicated by Table 3.

TABLE 3

| Bit | Description |
| --- | --- |
| 000 | PDCP status report |
| 001 | Interspersed ROHC feedback packet |
| 010 | LWA status report |
| 011-111 | reserved |

The FMS is a PDCP SN of the first missing PDCP SDU. The length of the FMS field is 12 bits when a 12 bit SN length is used, 15 bits when a 15 bit SN length is used, and 18 bits when an 18 bit SN length is used.

The Bitmap field is indicated by Table 4. The length of the Bitmap field is variable. The length of the bitmap field can be 0.

The Most Significant Bit (MSB) of the first octet of the type "Bitmap" indicates whether or not the PDCP SDU with the SN (FMS+1) modulo (Maximum_PDCP_SN+1) has been received and, optionally decompressed correctly. The Least Significant Bit (LSB) of the first octet of the type "Bitmap" indicates whether or not the PDCP SDU with the SN (FMS+8) modulo (Maximum_PDCP_SN+1) has been received and, optionally decompressed correctly.

TABLE 4

| Bit | Description |
| --- | --- |
| 0 | PDCP SDU with PDCP SN = (FMS + bit position) modulo (Maximum_PDCP_SN + 1) is missing in the receiver. The bit position of $N^{th}$ bit in the Bitmap is N, i.e., the bit position of the first bit in the Bitmap is 1. |
| 1 | PDCP SDU with PDCP SN = (FMS + bit position) modulo (Maximum_PDCP_SN + 1) does not need to be retransmitted. The bit position of $N^{th}$ bit in the Bitmap is N, i.e., the bit position of the first bit in the Bitmap is 1. |

FIG. 10A is a conceptual diagram for Logged MDT, and FIG. 10B is a conceptual diagram for Immediate MDT.

In wireless mobile networks quality of user experience changes dynamically and depends on large variety of factors. Because of that mobile operators are willing to timely and effectively evaluate provided Quality of Service (QoS) in their networks. Nowadays the main tool for monitoring network state and performance is drive testing. To replace this expensive and mostly manual procedure, concept of Minimization of Drive Tests (MDT) is being developed in 3GPP LTE standardization.

MDT is about UE measurement collection for off-line processing. No automatic mechanism is defined MDT. The MDT mode includes 2 modes for MDT measurements: Logged MDT and Immediate MDT.

The Immediate MDT is that a MDT functionality involving measurements performed by the UE in CONNECTED state and reporting of the measurements to eNB/radio network controller (RNC) available at the time of reporting condition as well as measurements by the network for MDT purposes. The Logged MDT is a MDT functionality involving measurement logging by UE in IDLE mode, CELL_paging channel (CELL_PCH), UTRAN registration area_PCH (URA_PCH) states and CELL_forward access channel (CELL_FACH) state when second DRX cycle is used (when UE is in UTRA) for reporting to eNB/RNC at a later point in time, and logging of MBSFN measurements by E-UTRA UE in IDLE and CONNECTED modes.

MDT measurements may include packet delay measurement, packet discard rate measurement, and packet loss rate measurement.

Packet Delay in DL per QCI refers to packet delay for DRBs. The objective of this measurement is to measure L2 Packet Delay for operations and maintenance (OAM) performance observability or for QoS verification of MDT. For arrival of packets the reference point is PDCP upper service access point (SAP). For successful reception the reference point is MAC lower SAP. The Detailed Definition and explanations of the Packet Delay in DL per QCI can be found in Math figure 1 and Table 5 below.

$$M(T, qci) = \left[ \frac{\sum_{\forall i} tAck(i) - tArriv(i)}{I(T)} \right] \quad \text{[Math. 1]}$$

TABLE 5

| | |
| --- | --- |
| M(T, qci) | Packet Delay in the DL per QCI, averaged during time period T. Unit: Integer ms. |
| tArriv(i) | The point in time when PDCP SDU i arrives. |
| tAck(i) | The point in time when the last piece of PDCP SDU i was received by the UE according to received HARQ feedback information. |
| i | A PDCP SDU that arrives at the PDCP upper SAP during time period T. PDCP SDU for which HARQ acknowledgement is not received for all parts shall not be included in the calculation. |
| I(T) | Total number of PDCP SDUs i. |
| T | Time Period during which the measurement is performed |

FIG. 11 is a conceptual diagram for decomposition of UL packet delay.

One of the major goals of UL packet delay measurement in MDT is to measure the end-to-end delay in PDCP layer. To cover UL packet delay experienced in access stratum (AS) layer, the time duration between "the point in time that a PDCP SDU arrives at PDCP upper SAP" in transmitter side and "the point in time that the last part of PDCP SDU is delivered to PDCP upper SAP" in receiver side should be considered.

Referring to FIG. 11, the UL packet delay in AS layer can be decomposed into three delays, i.e., queuing delay, transmission delay and re-assembly delay.

Each component of UL packet delay can be calculated as follows.

Queuing delay (i.e., delay in the UE transmitter side) can be calculated by using a time duration between a time point when "a PDCP SDU arrives at PDCP upper SAP (TP_PDCP_Tx)" and a time point when "the first part of the PDCP SDU is delivered to MAC (TP_MAC_Tx)" in the UE side.

Transmission delay (i.e., delay in radio interface) can be calculated by using a time duration between a time point when "the first part of the PDCP SDU is delivered to MAC (TP_MAC_Tx)" in the UE side and a time point when "the last part of the PDCP SDU arrives at MAC (TP_MAC_Rx)" in the eNB side. This delay may include the retransmision delay.

Re-assembly delay (i.e., delay in the eNB receiver side) can be calculated by using the summation of a time duration between a time point when "the last part of PDCP SDU arrives at MAC in eNB side (TP_MAC_Rx)" and a time point when "the last part of PDCP SDU was delivered to PDCP upper SAP (TP_PDCP_Rx)" in the eNB side. This delay includes the re-ordering delay.

FIG. 12 is conceptual diagram for performing an UL packet delay measurement according to an exemplary embodiment of the present invention.

One way of performing UL packet delay measurement in AS layer is to transmit a PDCP PDU including time information. By transmitting the PDCP PDU including the time information from a UE and calculating the delay of each PDCP PDU based on a time of reception and the received time information in an eNB side, the eNB can know the UL packet delay in AS layer from a PDCP upper SAP in the UE transmitter to a PDCP upper SAP in the eNB receiver. However, including the time information for UL packet delay in each PDCP PDU may increase overhead in PDCP PDUs.

In order to overcome overhead problem when including the time information (hereinafter, a time stamp) for measuring UL packet delay for each PDCP PDU (hereinafter, a Time Stamp PDCP PDU), it is invented that the UE transmits the Time Stamp PDCP PDU when the UL packet delay of a PDCP SDU in the UE transmitter side (i.e., queuing delay) is above a threshold. The time stamp is represented as one of subframe number, radio frame number, or absolute time.

The UE may set the value of the time stamp for a PDCP SDU to a time when the PDCP SDU is arrived at PDCP upper SAP, or a time when the corresponding PDCP PDU is submitted to a lower layer.

The UE may attach the Time Stamp field in each transmitted PDCP PDU, or every N-th PDCP PDU. The periodicity of inclusion of Time Stamp field can be configured by the eNB via a RRC message or a PDCP Control PDU.

In some embodiments, the UE may perform ciphering for only Data field in the Time Stamp PDCP PDU. That is, D/C field, PDCP SN field and Time Stamp field in the Time Stamp PDCP PDU are not ciphered. Or, the UE may perform ciphering for only Data field and Time Stamp field in the Time Stamp PDCP PDU. That is, D/C field and PDCP SN field in the Time Stamp PDCP PDU are not ciphered.

In some embodiments, the UE may transmit the Time Stamp PDCP PDU when a message which requests to send the Time Stamp PDCP PDU is received from the eNB. The message may be a RRC signal, a PDCP control PDU, a MAC control element, or a PHY signal. Or, the UE may transmit the Time Stamp PDCP PDU when a configured time duration is reached. That is, the UE may transmit the Time Stamp PDCP PDU periodically. The configured time duration may be received by a RRC signal or pre-defined. Or, the UE may transmit the Time Stamp PDCP PDU when a configured number of PDCP PDU is transmitted. A value of the configured number of PDCP PDU may be received by a RRC signal or pre-defined. Or, the UE may transmit the Time Stamp PDCP PDU when a configured number of bytes is transmitted. A value of the number of bytes may be received by a RRC signal or pre-defined. Or, the UE may transmit the Time Stamp PDCP PDU when a queuing delay is above a threshold. A value of the threshold may be received by a RRC signal or pre-defined. Or, the UE may transmit the Time Stamp PDCP PDU when the configured time duration is reached and the queuing delay is above the threshold.

When the UE calculates the queuing delay of each PDCP SDU in the UE transmitter side, the UE records a time duration between a time point when a PDCP SDU arrives at PDCP upper SAP (TP_PDCP_Tx) and a time point when the first part of this PDCP SDU is delivered to MAC (TP_MAC_Tx) for each PDCP SDU. A time interval for calculating queuing delay (e.g., a measurement period) is configured by the eNB by receiving an RRC message. The time interval may be defined as number of subframes, number of radio frames, or absolute time interval.

The eNB maintains a state variable TP_PDCP_Rx for each received PDCP PDU. The eNB may set the value of the TP_PDCP_Rx to a time when: i) the PDCP PDU is received from a lower layer, ii) the MAC PDU containing the PDCP PDU is received by a HARQ process, or iii) the PDCP SDU is delivered to PDCP upper SAP. The eNB can be calculate an UL packet delay of a PDCP PDU by subtracting TP_PDCP_Rx by a value of the time stamp included in the PDCP PDU.

Use of the Time Stamp PDCP PDU (i.e., a new PDCP Data PDU including the Time Stamp field) may be configured by the eNB via a RRC message or a PDCP Control PDU. The eNB may request the use of Time Stamp field to the PDCP transmitter.

Preferably, the use of Time Stamp can be configured per radio bearer (RB), can be configured for a certain time period, and can be enabled or disabled.

Referring to FIG. 12, For determining whether to generate a PDCP PDU including a PDCP SDU and a time stamp for the PDCP SDU, the UE checks whether a value of queuing delay of a PDCP SDU is above a threshold (S1201). As discussed above, the queuing delay of the PDCP SDU may correspond to a time difference between a time point when the PDCP SDU is received from the upper layer and a time point when the PDCP SDU is submitted to a lower layer.

After the checking, the UE generates and transmits a PDCP PDU including the PDCP SDU and a time stamp for the PDCP SDU, if the value of the queuing delay is above the threshold (S1203). In contrast, if the value of the queuing delay is lower than or equal to the threshold, the PDCP PDU may not include the time stamp. A value of the time stamp for the PDCP SDU may be set to a time when the PDCP SDU is received from the upper layer. Preferably, the time stamp is represented by using subframe number, radio frame number, or absolute time.

In some embodiments, the time stamp is included at beginning of the PDCP PDU, at a position between a data/control (D/C) field and a PDCP sequence number (SN) field of the PDCP PDU, at a position between the PDCP SN field and a data field of the PDCP PDU, or at end of the PDCP PDU. More detailed format of PDCP PDU including the time stamp will be showed in FIGS. 13A to 13D.

Meanwhile, before transmitting the PDCP PDU, the UE can cipher at least part of the PDCP PDU. In some embodiments, only the data field in the PDCP PDU is ciphered. That is, D/C field, PDCP SN field and Time Stamp field in the Time Stamp PDCP PDU are not ciphered. Or, only the data field and the time stamp in the PDCP PDU are ciphered. That is, D/C field and PDCP SN field in the Time Stamp PDCP PDU are not ciphered FIGS. 13A to 13D show various formats of a PDCP PDU including a time stamp according to an exemplary embodiment of the present invention.

In the present exemplary embodiments, it is assumed that length of a PDCP SN field is 7 bits, and length of a time stamp field is 16 bits.

Referring to FIG. 13A, a time stamp field is included at beginning of the PDCP PDU. As shown in FIG. 13A, octets containing the time stamp field (i.e., Oct 1 and 2) are included firstly in the PDCP DPU, and directly followed by an octet containing a data/control (D/C) field (i.e., Oct 3).

Referring to FIG. 13B, the time stamp field is included at a position between the D/C field and a PDCP sequence number (SN) field of the PDCP PDU. As shown in FIG. 13B, at least part of the time stamp field can be contained in an octet containing the D/C field (i.e., Oct 1) or an octet containing the PDCP SN field (i.e., Oct 3).

Referring to FIG. 13C, the time stamp field is included at a position between the PDCP SN field and a data field of the PDCP PDU. As shown in FIG. 13C, octets containing the time stamp field (i.e., Oct 1 and 3) are included first after an octet containing the PDCP SN field (i.e., Oct 1) and directly followed by octet(s) containing a Data field (i.e., Oct 1).

Referring to FIG. 13D, the time stamp field is included at end of the PDCP PDU. As shown in FIG. 13D, octets containing the time stamp field (i.e., Oct N−1 and N) are included after octet(s) containing the Data field (i.e., Oct 2 to N−2) and included lastly in the PDCP DPU.

FIG. 14 shows an example for transmitting Time Stamp PDCP PDUs according to an exemplary embodiment of the present invention.

In the present exemplary embodiment, it is assumed that a threshold value of queuing delay is 100. The UE may receive the threshold value of queuing delay (100) by a RRC signal.

Referring to FIG. 14, the UE sets a value of time stamps for each PDCP SDU to a time when each PDCP SDU is arrived at PDCP upper SAP. That is, the UE sets time stamp 1 for PDCP SDU 1, time stamp 2 for PDCP SDU 2, time stamp 3 for PDCP SDU 3, and time stamp 4 for PDCP SDU 4.

During a configured time duration for calculating queuing delay (e.g., a measurement period), the UE calculates queuing delay by recording a time duration between a time point when a PDCP SDU arrives at PDCP upper SAP (TP_PDCP_Tx) and a time point when the first part of this PDCP SDU is delivered to MAC (TP_MAC_Tx) for each PDCP SDU.

In the present exemplary embodiment, as shown in FIG. 14, the calculated queuing delays of each PDCP PDU (PDCP PDU (PDCP PDU 1~PDCP PDU 4) are assumed as following: i) queuing delay of PDCP SDU 1 (TP_PDCP_Tx 1−TP_MAC_Tx 1) is 180, ii) queuing delay of PDCP SDU 2 (TP_PDCP_Tx 2−TP_MAC_Tx 2) is 60, iii) queuing delay of PDCP SDU 3 (TP_PDCP_Tx 3−TP_MAC—Tx 3) is 120, and iv) queuing delay of PDCP SDU 4 (TP_PDCP_Tx 4−TP_MAC_Tx 4) is 220.

The UE transmits the Time Stamp PDCP PDU including PDCP SDU whose queuing delay is above the threshold value of queuing delay. That is, the UE transmits PDCP PDU 1 including time stamp 1 and PDCP SDU 1 at t=1, PDCP PDU 3 including time stamp 3 and PDCP SDU 3 at t=4, and PDCP PDU 4 including time stamp 4 and PDCP SDU 4 at t=5. Here, the UE may transmit PDCP PDU 2, which includes PDCP SDU 2 but does not include time stamp 2.

The eNB can calculate the UL packet delay of the received Time Stamp PDCP PDUs by using a value of corresponding time stamp and a time point when the corresponding PDCP SDU is delivered to PDCP upper SAP (TP_PDCP_Rx). Specifically, an UL packet delay of Time Stamp PDCP PDU 1 is calculated by subtracting TP_PDCP_Rx 1 from TP_PDCP_Tx 1, and an UL packet delay of Time Stamp PDCP PDU 3 is calculated by subtracting TP_PDCP_Rx 3 from TP_PDCP_Tx 3, and an UL packet delay of Time Stamp PDCP PDU 4 is calculated by subtracting TP_PDCP_Rx 4 from TP_PDCP_Tx 4.

After that, the eNB can obtain an UL packet delay measurement by summing the UL packet delay results for each of Time Stamp PDCP PDUs including PDCP SDU whose delay is above the threshold by dividing number of the Time Stamp PDCP PDUs.

According to the present invention as discussed above, it is possible to calculate UL packet delay in PDCP layer aspect efficiently and accurately.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
checking whether a value of queuing delay of a packet data convergence protocol service data unit (PDCP SDU) is above a threshold; and
generating and transmitting a PDCP protocol data unit (PDU) including the PDCP SDU and a time stamp for the PDCP SDU, when the value of the queuing delay is above the threshold,
wherein a value of the time stamp for the PDCP SDU is set to a time when the PDCP SDU is received from an upper layer,
wherein the PDCP PDU includes a data/control (D/C) field, a PDCP sequence number (SN) field and a data field, and
wherein only the data field except the D/C field, the PDCP SN field and the time stamp in the PDCP PDU is ciphered.

2. The method according to claim 1,
wherein the queuing delay is a time difference between a time point when the PDCP SDU is received from the upper layer and a time point when the PDCP SDU is submitted to a lower layer.

3. The method according to claim 1,
wherein the PDCP PDU does not include the time stamp the value of the queuing delay is lower than or equal to the threshold.

4. The method according to claim 1,
wherein the time stamp is represented by using subframe number, radio frame number, or absolute time.

5. The method according to claim 1,
wherein the time stamp is included at beginning of the PDCP PDU, at a position between the D/C field and the PDCP SN field of the PDCP PDU, at a position between the PDCP SN field and the data field of the PDCP PDU, or at end of the PDCP PDU.

6. A User Equipment (UE) for operating in a wireless communication system, the UE comprising:
a Radio Frequency (RF) module; and
a processor operably coupled with the RF module and configured to:
check whether a value of queuing delay of a packet data convergence protocol service data unit (PDCP SDU) is above a threshold; and
generate and transmit a PDCP protocol data unit (PDU) including the PDCP SDU and a time stamp for the PDCP SDU, when the value of the queuing delay is above the threshold,
wherein a value of the time stamp for the PDCP SDU is set to a time when the PDCP SDU is received from an upper layer,
wherein the PDCP PDU includes a data/control (D/C) field, a PDCP sequence number (SN) field and a data field, and
wherein only the data field except the D/C field, the PDCP SN field and the time stamp in the PDCP PDU is ciphered.

7. The UE according to claim 6,
wherein the queuing delay is a time difference between a time point when the PDCP SDU is received from the upper layer and a time point when the PDCP SDU is submitted to a lower layer.

8. The UE according to claim 6,
wherein the PDCP PDU does not include the time stamp the value of the queuing delay is lower than or equal to the threshold.

9. The UE according to claim 6,
wherein the time stamp is represented by using subframe number, radio frame number, or absolute time.

10. The UE according to claim 6,
wherein the time stamp is included at beginning of the PDCP PDU, at a position between the D/C field and the PDCP SN field of the PDCP PDU, at a position between the PDCP SN field and the data field of the PDCP PDU, or at end of the PDCP PDU.

* * * * *